United States Patent [19]

Devouassoux et al.

[11] Patent Number: 4,995,621
[45] Date of Patent: Feb. 26, 1991

[54] RADIAL SEAL RINGS

[75] Inventors: Serge Devouassoux, Langres; Michel Marchiset, Chalindrey; Michel Saxod, Langres, all of France

[73] Assignee: Procal, Langres, France

[21] Appl. No.: 886,617

[22] Filed: Jul. 18, 1986

[30] Foreign Application Priority Data

Jul. 18, 1985 [FR] France ............... 85 11007

[51] Int. Cl.$^5$ ............................................. F16J 15/32
[52] U.S. Cl. ......................................... 277/37; 277/152
[58] Field of Search ................... 277/37, 35, 152, 153

[56] References Cited

U.S. PATENT DOCUMENTS

| 2,476,324 | 7/1949 | Reich | 277/152 |
| 2,583,085 | 1/1952 | Campbell | 277/152 X |
| 3,356,376 | 12/1967 | Bradfute et al. | 277/37 |
| 4,125,266 | 11/1978 | Schonherr | 277/152 X |

FOREIGN PATENT DOCUMENTS 122319 10/1984 European Pat. Off.
2443625 7/1980 France

*Primary Examiner*—Allan N. Shoap
*Attorney, Agent, or Firm*—Hoffman, Wasson & Gitler

[57] ABSTRACT

A radial seal ring has a frame or reinforcement, a body of an elastomer, and a seal lip of a low friction material such as a fluorine containing resin, particularly PTFE, adhered to the body. The seal lip extends radially of the body to provide a portion unadhered to the body and which has an annular recess in the surface thereof which faces toward the body. The recess is located adjacent to a peripheral edge of the body and defines a controlled region of deflection of the lip seal. The annular recess is formed during molding by pinching a preformed disc of the lip seal between an annular rib of the mold and an opposed surface of the mold.

5 Claims, 2 Drawing Sheets

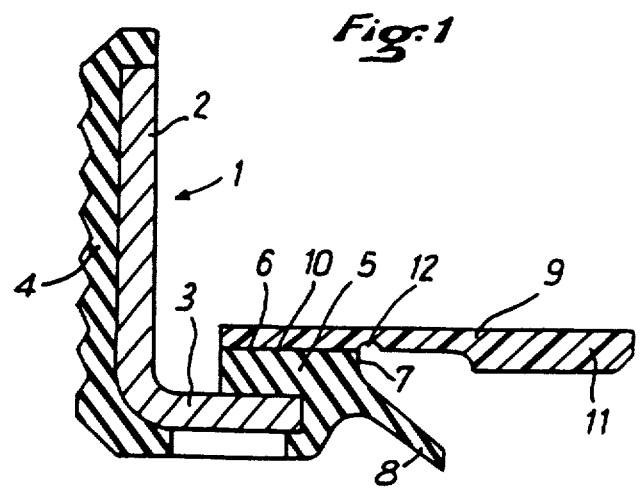
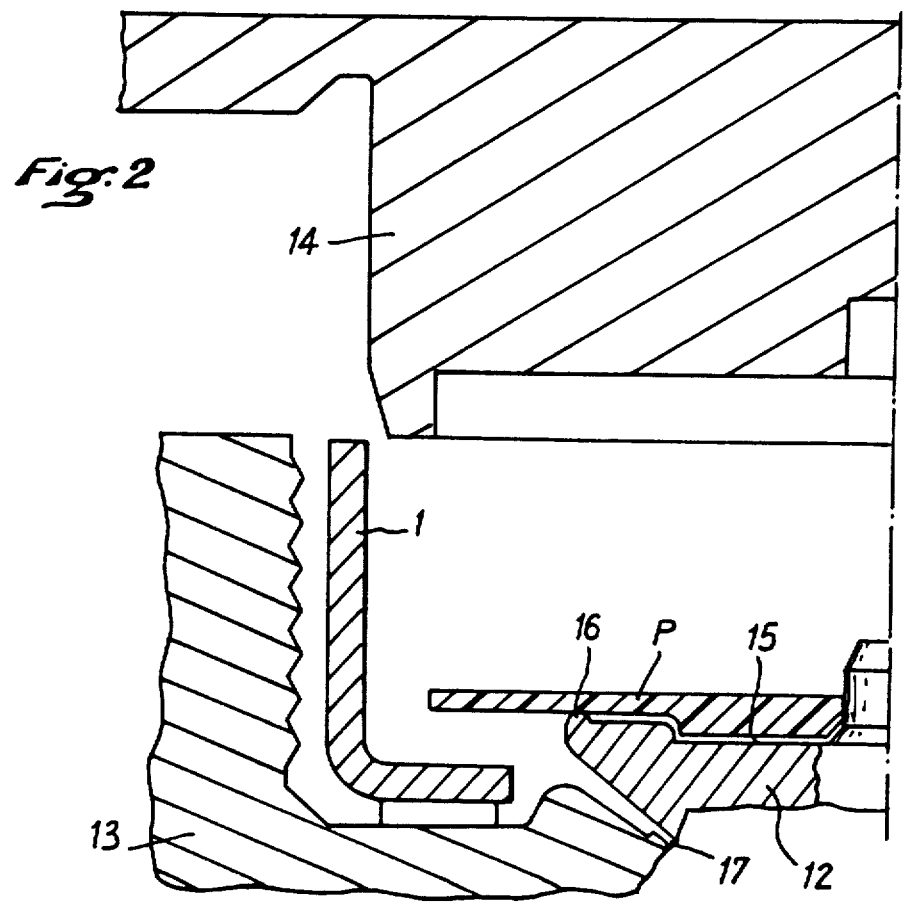

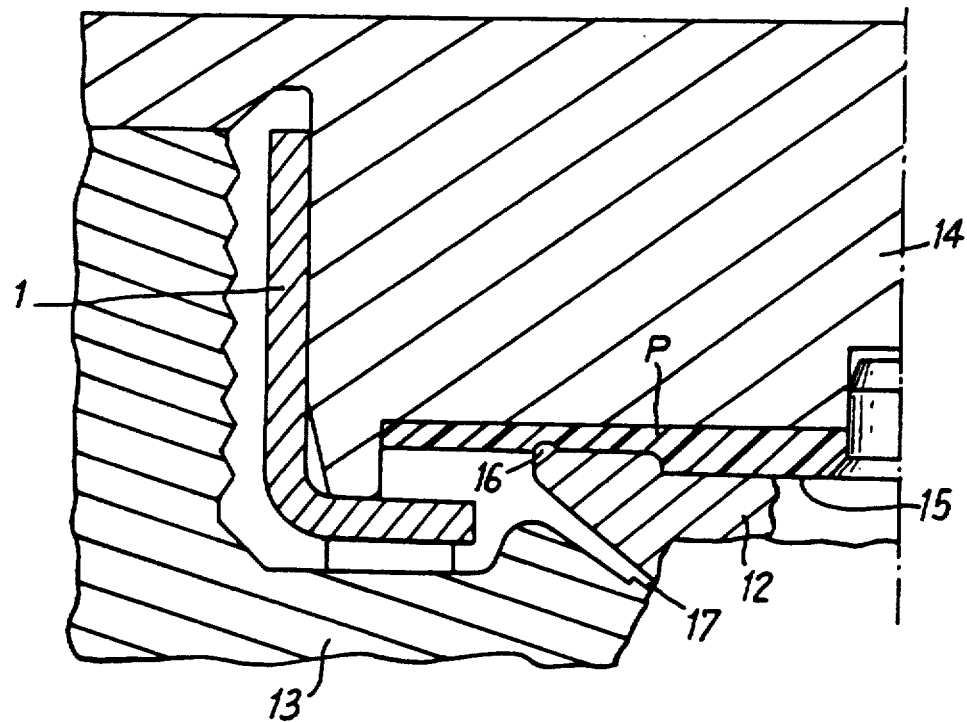
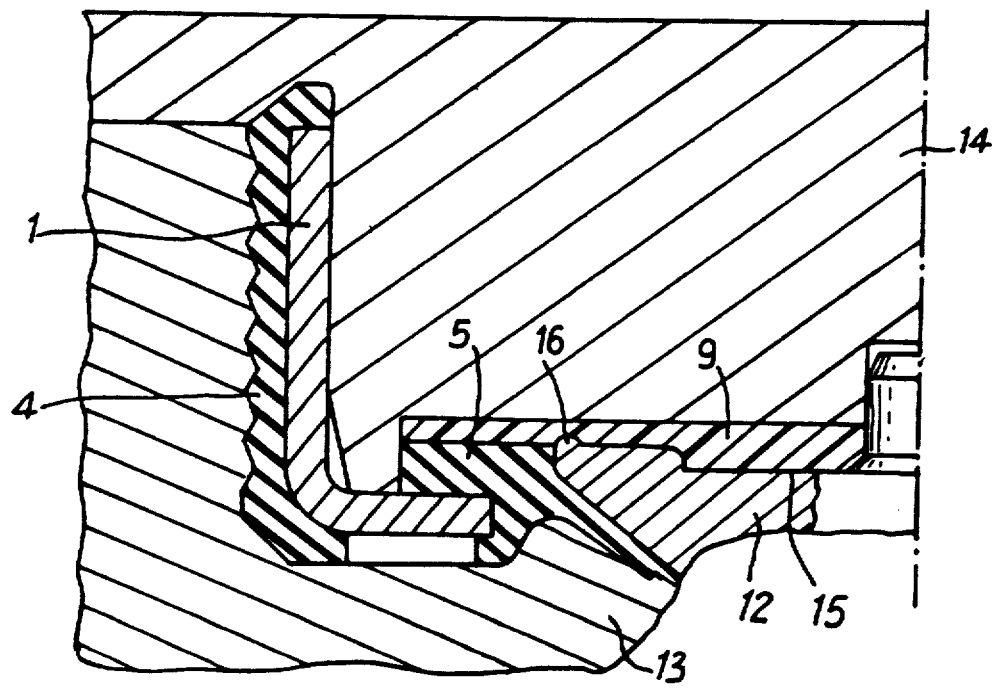

RADIAL SEAL RINGS

The present invention relates to seal rings of the radial type, and more particularly to such seal rings comprising a frame or reinforcement, a body, particularly of an elastomer, and a seal lip of a low-friction material particularly of a fluorine-containing resin such as in particular, polytetrafluorethylene (PTFE), which may or may not be loaded, adhered to the body and projecting radially therefrom.

BACKGROUND OF THE INVENTION

Such seals can also include a secondary anti-dust lip, of the same material as the body and projecting therefrom, as well as a coating or covering of the same material on a bearing surface of the frame which presses on the shaft on which the ring is positioned.

Examples of manufacture of such rings are described in German patent application No. 33 09 538.

Such seal rings have certain disadvantages.

First it should be noted that the shearing stress which occurs at the interface between the elastomer body and the seal lip of fluorine containing resin is significant and causes the resin lip to unadhere and separate from the peripheral edge of the body, leading to rapid deterioration of the seal.

In addition, the region of deflection of the fluorine-containing resin lip is relatively indeterminable, so that it is not possible to precisely control the pressure of the lip on the facing seal bearing surface, and it is not possible to control precisely the radial pressure of the ring.

SUMMARY OF THE INVENTION

The present invention relates to a seal ring of the general type discussed above which avoids the disadvantages of the prior rings.

The present invention also relates to a process for manufacturing such a ring by injection molding.

The seal ring according to the invention is essentially characterized by the fact that it has, in the seal lip, in a free portion of the lip not adhered to the body, an annular recess located in the surface of the lip which faces the body, in the immediate proximity of the peripheral edge of the body.

The recess according to the invention can advantageously have an arcuate or circular cross-section, but other forms of section such as triangular, can be used, within the scope of the invention.

The depth of the recess advantageously is in the range of about 0.05 mm to about 0.2 mm.

It is to be understood that it is this region of the seal lip of the fluorine-containing resin having the recess, and thus having a reduced thickness, which constitutes the region of deflection of the seal lip with respect to the body and the frame of the ring, and that this region of deflection is perfectly defined. One can also, by a determination of the depth of the recess, ensure a controlled residual thickness of the lip of the fluorine-containing resin in this region and thus regulate the value of the radial load or pressure of the ring. The shearing stress between the seal lip and the the elastomer body is also reduced in this region, which in turn vastly reduces the risks of separation or unadhering of the lip.

The present invention has also as an object a process for manufacturing such a ring, essentially characterized by the fact that there are placed in an injection molding mold, having a central core with a projecting annular rib, a lower mold part surrounding the the central core, and an upper mold part which covers the core and the lower mold part, a machined or preformed disc of fluorine-containing resin which is placed on the core, and a metal frame which is placed on the lower part of the mold, after which the mold is closed to pinch the disc of fluorine-containing resin between the the upper part of the mold and the core, the annular rib of the core forming in the disc an imprint corresponding to the recess to be formed in the the seal lip of the ring, and that a flexible material, particularly an elastomer, to form the body of the of the ring is injected through injection passages of the mold, after which the finished ring is ejected from the mold.

It should be noted that the annular peripheral rib provided on the core, in addition to forming the recess in the seal lip, reinforces the sealing of the mold on the disc of fluorine-containing resin, and thus prevents overflow of the injected material beyond the desired regions of the mold.

In order to make the invention better understood, one embodiment will now be described as a non-limiting example with reference to the accompanying drawings.

BRIEF DESCRIPTION OF DRAWINGS

FIG. 1 shows in half-section, a seal ring according to the invention; and

FIG. 2 to 4 are each views in half-section showing three steps in the process, according to the invention, for forming the seal ring shown at FIG. 1.

DETAILED DESCRIPTION

The ring according to the invention is shown at FIG. 1 in its configuration immediately after manufacture. The ring has a conventional annular metal frame 1, with a long axial leg 2, adapted to rest on a shaft (not shown) and a shorter radial leg 3. On the leg 2 of the frame is adhered in a conventional manner, an elastomer coating 4 adapted to contact the shaft.

Adhered to leg 3 of the frame is an elastomer body 5 having a flat upper support surface 6, and a peripheral edge 7 adjacent thereto.

Body 5 also comprises a unitary extension constituting a secondary anti-dust lip 8. The ring according to the invention further comprises a sealing member 9 of flourine resin such as PTFE a first portion of which is adhered at its bonding support surface 10 to the upper support surface 6 of the body 5, and a second portion of the sealing member 9 extending radially beyond the peripheral edge 7 of the body and having an end 11 of greater thickness than said first portion.

According to the invention, there is provided in the sealing member 9 radially, to one side of the support surface 6, an annular axially facing groove or recess 12, whose cross-section is a circular arc in the embodiment shown. By way of example, this recess has a depth of 0.2 mm and a circular section radius of 0.5 mm.

This recess 12 is thus formed adjacent the line of connection of the peripheral edge 7 of body 5 and sealing member 9.

With reference to FIGS. 2 to 4, a process for making such a seal ring by injection molding will now be described.

For this purpose a mold is used which has a central core 12, a lower mold part 13, and an upper mold part 14.

The core 12 has an annular bearing or support surface 15, which functions as a support for a preform P in the shape of an annular disc destined to form the seal lip 9 of the ring.

The preform P of fluorine resin, particularly PTFE, can be treated by chemical etching, in the conventional manner, to increase its ability to adhere, particularly in the region to which the body material will be applied, i.e. the surface 10. At the periphery of the bearing surface 15 is an axially projecting annular rib 16, semi-circular in section, in the example shown, and which forms the previously mentioned recess 12 in the seal lip 9.

A frame 1 is also positioned in the mold.

The mold has injection passages such as inner passages 17, and also has passages (not shown) which communicate with the region of the coating material 4.

FIG. 2 shows the arrangement of the elements in the open position of the mold.

FIG. 3 shows the mold in a closed position prior to injection. When the mold is closed, the disc P is clamped between the upper part 14 and the lower core 12, and rib 16 is pressed into the disc to form the recess 12. It will be noted that the mold is dimensioned to define an interior cavity which corresponds exactly to the dimensions of the body 5, and covering 4 of the frame. Correspondingly, during injection, the injected elastomer fills the mold cavity and forms body 5 and covering 4.

It is to be understood that to form a recess 12 with a section other than a circular section, a flange 16 is provided on mold core 12 with the corresponding shape. For example, the rib can have a V shaped section.

Various types of materials can be used for the body, such as elastomers of the nitrile, polyacrylic, silicon, or the fluorine-containing types.

Although the invention has been described in connection with a particular embodiment, it is of course in no way thereby limited and can undergo numerous variations and modifications without exceeding either its scope or its spirit.

We claim:

1. In a radial seal ring comprising:
   a metal annular frame;
   an intermediate annular flexible elastomeric body, attached to said frame, having a first peripheral surface facing said frame and a second peripheral surface facing away from said frame, and a support surface intersecting said second peripheral surface; and
   a sealing member attached to the support surface of said intermediate body, said sealing member having a first portion with a bonding surface facing the support surface of the intermediate body and adhered thereto, and a second portion, comprising a sealing lip, extending radially from said first portion, away from said frame; the improvement wherein
   said sealing member has a circumferential axially facing groove between its first and second portions, adjacent said second peripheral surface, whereby said groove provides a predictable locus for bending of said sealing member, thereby avoiding bending at said bonding surface which would tend to result in delamination.

2. A radial seal ring according to claim 1, wherein said groove has a cross-section which is a circular arc.

3. A radial seal ring according to claim 2, wherein said groove has a depth in the range of 0.05 to 0.2 mm.

4. A radial seal ring according to claim 1, wherein said groove has a depth in the range of 0.05 to 0.2 mm.

5. A radial seal ring according to claim 1, wherein said sealing member is formed from a polytetrafluoroethylene material.

* * * * *